(12) United States Patent
Schwartz et al.

(10) Patent No.: US 11,381,120 B2
(45) Date of Patent: Jul. 5, 2022

(54) WIRELESS CHARGING INTERFERENCE MITIGATION

(71) Applicant: Apple Inc., Cupertino, CA (US)

(72) Inventors: Adam L. Schwartz, Redwood City, CA (US); Ron Rafer C. Floresca, Auckland (NZ); Liang Chen, Auckland (NZ); Zaki Moussaoui, San Carlos, CA (US)

(73) Assignee: Apple Inc., Cupertino, CA (US)

( * ) Notice: Subject to any disclaimer, the term of this patent is extended or adjusted under 35 U.S.C. 154(b) by 206 days.

(21) Appl. No.: 16/868,120

(22) Filed: May 6, 2020

(65) Prior Publication Data

US 2021/0135507 A1  May 6, 2021

Related U.S. Application Data

(60) Provisional application No. 62/931,469, filed on Nov. 6, 2019.

(51) Int. Cl.
| | |
|---|---|
| *G07C 9/00* | (2020.01) |
| *B60L 53/12* | (2019.01) |
| *H02J 50/70* | (2016.01) |
| *H02J 50/80* | (2016.01) |
| *H04B 5/00* | (2006.01) |

(Continued)

(52) U.S. Cl.
CPC ............. *H02J 50/70* (2016.02); *B60R 25/24* (2013.01); *B60R 25/33* (2013.01); *G07C 9/00174* (2013.01); *H02J 7/02* (2013.01); *H02J 50/10* (2016.02); *H02J 50/80* (2016.02); *H04B 5/0037* (2013.01); *H04B 5/0081* (2013.01); *B60L 2270/147* (2013.01); *G07C 2009/00579* (2013.01)

(58) Field of Classification Search
CPC .... H02J 50/70; H02J 7/02; H02J 50/10; H02J 50/80; H02J 2310/48; B60R 25/24; B60R 25/33; B60R 25/245; G07C 9/00174; G07C 2009/00579; G07C 9/00309; H04B 5/0037; H04B 5/0081; B60L 2270/147; B60L 53/12; Y02T 10/70; Y02T 10/7072; Y02T 90/14

See application file for complete search history.

(56) References Cited

U.S. PATENT DOCUMENTS

| | | |
|---|---|---|
| 9,236,913 B2 | 1/2016 | Shimura et al. |
| 9,344,155 B2 | 5/2016 | Moes et al. |

(Continued)

FOREIGN PATENT DOCUMENTS

| | | |
|---|---|---|
| CN | 107968492 A | 4/2018 |
| DE | 102013222227 A1 | 4/2015 |

*Primary Examiner* — Nghia M Doan
(74) *Attorney, Agent, or Firm* — Treyz Law Group, P.C.; G. Victor Treyz; Tianyi He

(57) ABSTRACT

An electronic device such as a portable electronic device has wireless power receiving circuitry. A vehicle has a vehicle remote keyless system that transmits beacons. A key receives the beacons and responds with key codes to unlock doors and enable a vehicle ignition in the vehicle. In the presence of wireless power transfer operations there is a risk that wireless power signals will interfere with the reception of the beacons by the key. To ensure that beacons are satisfactorily received, conditions in which there is a risk of interference are detected and corresponding interference mitigation operations are performed.

25 Claims, 4 Drawing Sheets

(51) Int. Cl.
*H02J 50/10* (2016.01)
*B60R 25/24* (2013.01)
*B60R 25/33* (2013.01)
*H02J 7/02* (2016.01)

(56) References Cited

U.S. PATENT DOCUMENTS

| | | |
|---|---|---|
| 9,553,479 B2 | 1/2017 | Lee |
| 9,597,971 B2 | 3/2017 | Briz et al. |
| 9,647,482 B2 | 5/2017 | Rudolph |
| 9,735,610 B2 * | 8/2017 | Colja ................. H02J 7/042 |
| 10,027,172 B2 | 7/2018 | Colja et al. |
| 10,897,163 B2 * | 1/2021 | Iwasaki ............... H02J 50/60 |
| 2012/0153894 A1 * | 6/2012 | Widmer ............... H02J 50/60 |
| | | 320/108 |
| 2012/0299538 A1 | 11/2012 | Arai et al. |
| 2014/0009261 A1 | 1/2014 | Iwanaga |
| 2014/0103865 A1 | 4/2014 | Van Wiemeersch et al. |
| 2015/0130589 A1 * | 5/2015 | Miyazawa .............. B60R 25/24 |
| | | 340/5.61 |
| 2015/0270738 A1 | 9/2015 | Colja et al. |
| 2015/0336463 A1 * | 11/2015 | Boyer .................. H02J 50/12 |
| | | 320/108 |
| 2017/0093195 A1 | 3/2017 | Lee |
| 2019/0068003 A1 | 2/2019 | Falkenburg et al. |

\* cited by examiner

WIRELESS CHARGING INTERFERENCE MITIGATION

This application claims the benefit of provisional patent application No. 62/931,469, filed Nov. 6, 2019, which is hereby incorporated by reference herein in its entirety.

FIELD

This relates generally to vehicle systems, and, more particularly, to interactions between vehicle remote keyless systems and wireless power systems.

BACKGROUND

Vehicles are sometimes provided with remote keyless systems. Remote keyless systems allow users with electronic keys operating at wireless communications frequencies to wirelessly control vehicle door locks and vehicle ignition functions.

SUMMARY

Challenges may arise when using remote keyless systems in the presence of other wireless equipment. If care is not taken, for example, a wireless power system that is operated in the vicinity of a remote keyless system may degrade remote keyless system performance.

An electronic device such as a portable electronic device has wireless power receiving circuitry. During wireless power transfer operations, wireless power signals are transmitted from wireless power transmitter circuitry to the wireless power receiving circuitry to charge a battery in the electronic device. A vehicle has a vehicle remote keyless system that transmits vehicle remote keyless system beacons. A key receives the beacons and responds with key codes to unlock doors and enable a vehicle ignition in the vehicle. The wireless power transmitter circuitry may be located in the vicinity of the vehicle. During wireless power transfer operations, there is a risk that wireless power signals from the wireless power transmitter circuitry could interfere with the reception of the vehicle keyless system beacons by the key.

To ensure that beacons are satisfactorily received, conditions in which there is a risk of interference are detected and corresponding interference mitigation operations are performed.

Interference risk detection involves detection of vehicle remote keyless system beacons, detection of key codes transmitted by the key in response to received beacons, monitoring of vehicle location and comparisons of measured device locations to stored vehicle location information, monitoring of whether the electronic device has paired wirelessly with the vehicle, using an inertial measurement unit or other input-output device to determine whether the electronic device is experiencing motion representative of vehicular travel, and/or other operations to determine when a risk of interference is present.

Interference mitigation operations are used to ensure that the vehicle remote keyless system can be used to operate the vehicle. Interference mitigation operations include prompting a user to disable wireless power transfer operations or automatically inhibiting wireless power transfer operations, adjusting the waveform of transmitted wireless power signals, adjusting the frequency of transmitted wireless power signals (e.g., to a frequency that is at least not the same as the wireless beacon frequency), and other operations that allow the key to receive transmitted beacons and that may allow wireless power operations to take place simultaneously with vehicle remote keyless system operations.

DETAILED DESCRIPTION

Figure 1:
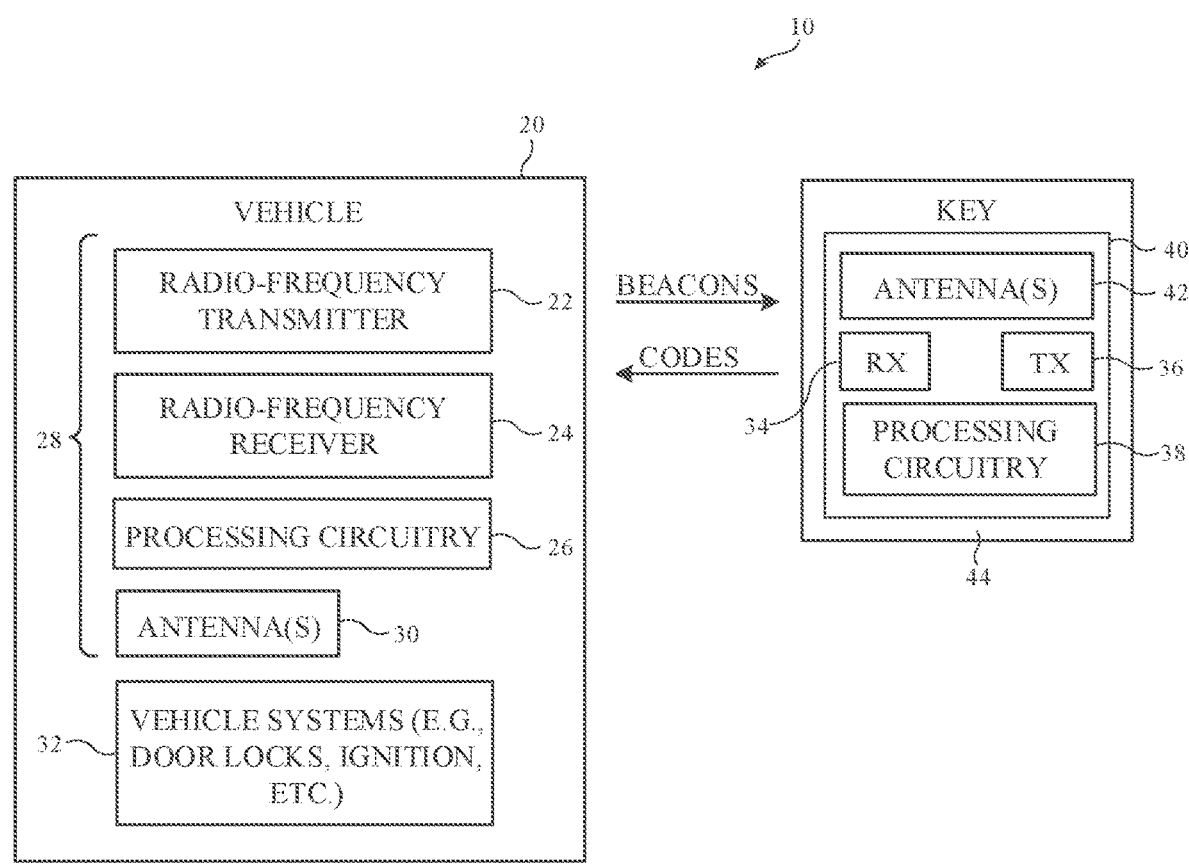
FIG. 1 is a schematic diagram of an illustrative system with a vehicle and key in accordance with an embodiment.

A vehicle is provided with a remote key system that allows a user to wirelessly enable operations such as a vehicle unlock and ignition. The vehicle system has one or more beacon transmitters to transmit wireless vehicle remote keyless system beacons. A user has a key that detects the beacons. The key may be a key fob, a key card, or a key system built into other equipment such as a wristwatch or cellular telephone.

Exemplary vehicle remote keyless system beacons are wireless signals at frequencies of typically 125 to 134 kHz, more generally within a range of 100 to 145 kHz. In response to detecting signals (hereinafter beacon(s) from the vehicle remote keyless system beacon transmitter, the key transmits key signals using a radio-frequency signal. Exemplary keys transmit wireless signals at frequencies of 300 to 1000 MHz. The key signals represent, in some examples, key codes that cause the remote key system to unlock vehicle doors and enable the vehicle ignition of the vehicle. The user may then enter the vehicle through the vehicle's unlocked doors and may start the vehicle's engine by pressing a start button in the vehicle.

An electronic device in the vehicle or near the vehicle (e.g., within 10 m or within 20 m) has wireless power transmitting circuitry that transmits wireless power signals to compatible devices. Examples of compatible devices include wristwatches, cellular telephones, removable battery cases, and other battery-powered electronic devices with wireless power receiving circuitry. In an embodiment, an electronic device in or near a vehicle that transmits wireless power is an accessory that draws power from the vehicle's power outlets such as Universal Serial Bus (USB) charging apparatuses (e.g., a charging pad or other accessory that is coupled to a power source in a vehicle). A removable battery case in or near a vehicle may also serve as a wireless power transmitter (e.g., battery case circuitry may serve as a transmitter when the battery case is located in or near a vehicle while transmitting power to a cellular telephone or other electronic device that is coupled to the battery case). Wireless power signals may be transmitted, for example, at frequencies of 110 kHz to 205 kHz. The wireless power signals are received by the wireless power receiving circuitry and used to charge a battery in the portable electronic device.

A transmitted wireless power signal may have a frequency that is identical to or close to a frequency associated with the vehicle remote keyless system beacons. In some scenarios, wireless power transmissions therefore poses a risk of interference with the beacons being transmitted by, the vehicle remote key system. This can impact the ability of a user to open vehicle doors and enable a vehicle's ignition using a key. To prevent undesired interference between wireless power operations and vehicle remote key system operations, detection operations can be used to detect the presence of potential interference conditions. If a risk of interference is detected, actions may be taken to mitigate the effects of wireless power transmissions on the operation of the vehicle remote key system. In this way, the user will be able to satisfactorily operate the vehicle using the key. In some scenarios, wireless power transfer operations may coexist with vehicle remote keyless system operations, meaning that both the vehicle remove keyless system and the wireless charging system can function in the presence of one another.

FIG. 1 is a system diagram of an illustrative system that includes a vehicle and an associated wireless key device. As shown in FIG. 1, system 10 includes vehicle 20. Vehicle 20 includes a vehicle body, a motor, steering equipment, brakes, and other vehicle components. Vehicle 20 may be an automobile, truck, motorcycle, or other vehicle.

As shown in FIG. 1, vehicle 20 includes a wireless key system such as vehicle remote keyless system 28. System 28 includes radio-frequency transmitter 22, radio-frequency receiver 24, and processing circuitry 26 (sometimes referred to as control circuitry). Radio-frequency transmitter 22 transmits vehicle remote keyless system beacons to key 44 using an antenna (see, e.g., antennas 30). The beacons may be transmitted at any suitable beacon frequency. As an example, the beacons may be transmitted at a frequency in the range of 100-145 kHz.

Radio-frequency receiver 24 uses an antenna (see, e.g., antennas 30) to receive radio-frequency key codes from key 44 at a frequency of 315 MHz to 435 MHz, 300 MHz to 1000 MHz (1 GHz) or other suitable key code frequency. Processing circuitry 26 controls the operation of system 28 and other systems in vehicle 20 such as vehicle systems 32. Vehicle systems 32 include door locks, ignition systems, and other devices that are controlled by processing circuitry 26. For example, key system 28 may open door locks and enable a vehicle ignition in response to receiving key codes from key 44.

Key circuitry 40 of key 44 includes antenna circuitry (see, e.g., antennas 42), radio-frequency receiver 34, and radio-frequency transmitter 36. Key circuitry 40 also includes processing circuitry 38 (sometimes referred to as control circuitry) and other components (e.g., a battery, an optional display, buttons, etc.). Processing circuitry 38 of key circuitry 40 uses radio-frequency receiver circuitry such as receiver 34 and an associated antenna (see, e.g., antennas 42) to monitor for incoming vehicle remote keyless system beacons. In response to detecting a beacon, processing circuitry 38 may automatically use radio-frequency transmitter circuitry such as radio-frequency transmitter 36 to transmit corresponding key codes to system 28 at a frequency of 315 MHz to 435 MHz, 300-1000 MHz, or other suitable key code frequency. System 28 adjusts vehicle systems 32 when the key codes are received. For example, system 28 can open door locks and enable an ignition system in vehicle systems 32 in response to receiving the key codes.

Wireless power signals may be transmitted between a wireless power charger (e.g., a mat) and a battery-operated device (e.g., a phone) in the presence of key 44 and vehicle 20. These wireless power signals can potentially interfere with reception of beacons by key 44 and thereby prevent a user from opening and operating vehicle 20. To help ensure satisfactory operation of vehicle remote keyless system functions, interference risk detection operations can be used to detect when a condition indicative of a risk of interference is present and appropriate interference mitigation operations can be taken in response.

Figure 2:
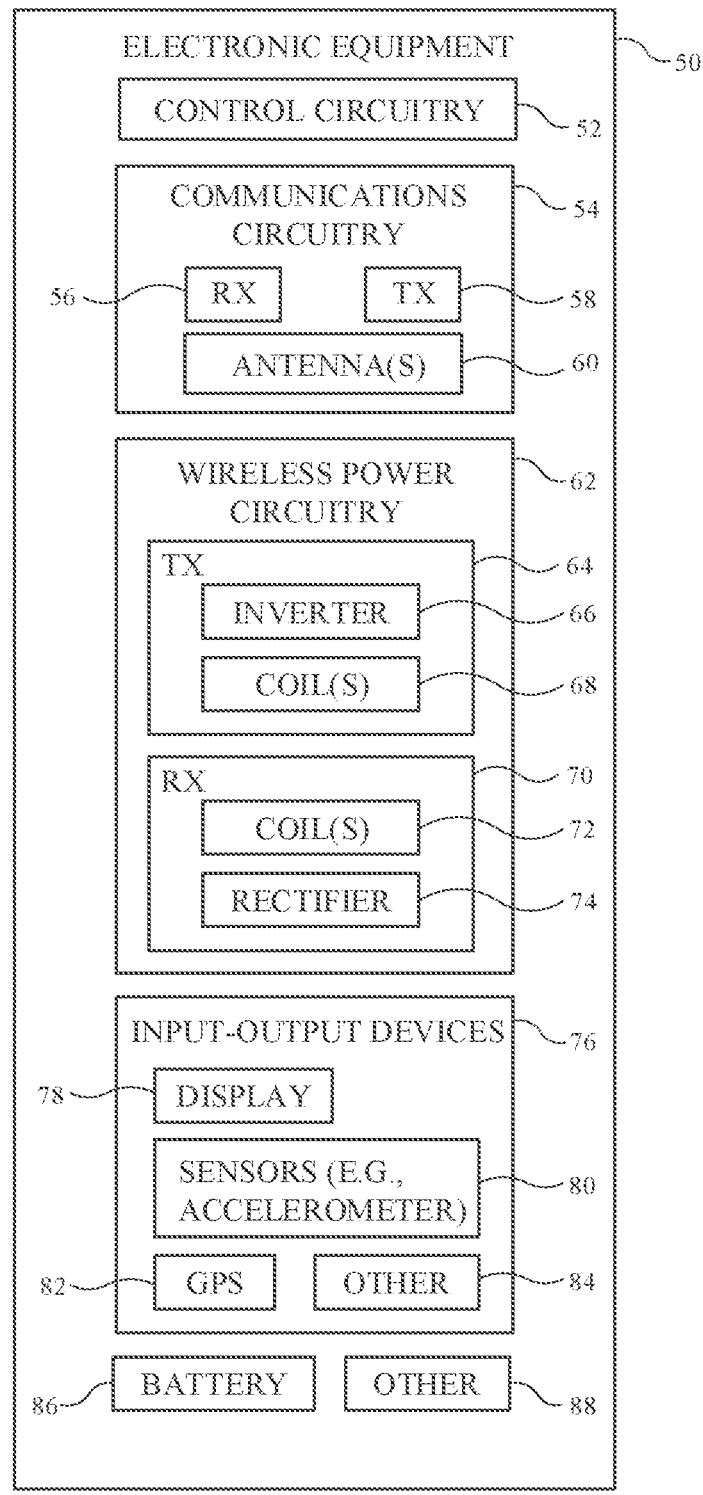
FIG. 2 is a schematic diagram of illustrative electronic equipment in accordance with an embodiment.

Wireless power signals can be transmitted and/or received using equipment of the type shown in FIG. 2. Some or all of the circuitry of equipment 50 of FIG. 2 may be used in forming an electronic device that is used in or near a vehicle. The electronic device may transmit wireless power and/or may receive wireless power. For example, a battery case may transmit wireless power and may optionally receive wireless power, a charging accessory such as a charging pad or puck may transmit wireless power, a cellular telephone, tablet computer, wristwatch, laptop computer, and other electronic devices can wirelessly receive power and can optionally wirelessly transmit power, etc. Accordingly, in some embodiments, a device formed from the circuitry of illustrative equipment 50 contains wireless power transmitting circuitry 62, in other embodiments, contains wireless power receiving circuitry 70, and in further embodiments, contains both wireless power transmitter circuitry and wireless power receiver circuitry. In general, equipment 50 may be used in a cellular telephone, a wristwatch, a tablet computer, a laptop computer, an accessory such as a computer stylus or other input-output device, other portable electronic devices, equipment that is part of an embedded system in vehicle 20, a removable case for an electronic device (e.g., a removable cover for a tablet computer, a removable battery case for a cellular telephone or other portable device, etc.), a wireless charging pad or puck, a key (see, e.g., key 44 of FIG. 1), and/or other electronic equipment.

Electronic equipment 50 of FIG. 2 includes optional components. One or more of these optional components may be omitted to reduce the cost and complexity of equipment 50. For example, when equipment 50 is used in forming part of vehicle 20, equipment 50 contains components such as vehicle controls (see, e.g., other circuitry 88) different from when equipment 50 is used in forming key 44 or a user's cellular telephone (as examples). The schematic diagram of FIG. 2 is presented as an example.

As shown in FIG. 2, equipment 50 includes control circuitry 52. Control circuitry 52 is used to control the operation of equipment 50. This control circuitry may include processing circuitry associated with microprocessors, power management units, baseband processors, digital signal processors, microcontrollers, and/or application-specific integrated circuits with processing circuits. The processing circuitry implements desired control and communications features in equipment 50. For example, the processing circuitry may be used in controlling wireless power operations, processing sensor data and other data, processing user input, handling negotiations between devices, sending and receiving wireless communications (e.g., commands, beacons, sensor measurements and other data, etc.), making measurements, monitoring battery status, controlling battery charging, and otherwise controlling the operation of equipment 50.

Control circuitry 52 may be configured to perform operations in equipment 50 using hardware (e.g., dedicated hardware or circuitry), firmware, and/or software. Software code for performing system operations is stored on non-transitory computer readable storage media (e.g., tangible computer readable storage media) in control circuitry 52. The software code may sometimes be referred to as software, data, program instructions, instructions, or code. The non-transitory computer readable storage media may include non-volatile memory such as non-volatile random-access memory (NVRAM), one or more hard drives (e.g., magnetic drives or solid state drives), one or more removable flash drives or other removable media, or the like. Software stored on the non-transitory computer readable storage media may be executed on the processing circuitry of control circuitry 52. The processing circuitry may include application-specific integrated circuits with processing circuitry, one or more microprocessors, a central processing unit (CPU) or other processing circuitry.

Equipment 50 includes input-output circuitry as shown by input-output devices 76 of FIG. 2. Input-output devices 76 may include output devices such as display 78, speakers for emitting sound, and other devices 84 (e.g., haptic output devices, etc.). Satellite navigation system circuitry in devices 76 such as global positioning system receiver 82 may be used to gather information on the current location of equipment 50 and its velocity. Sensors 80 may include image sensors, optical proximity sensors, three-dimensional image sensors formed from light emitters that project beams of light and corresponding image sensors that detect dots where the projected light beams strike objects, camera flash components, and/or other circuits that emit and/or detect light, ambient light sensors, force sensors, radio-frequency circuitry such as radar circuitry and/or other radio-frequency circuitry for detecting the location and movement of objects, microphones for gathering sound, touch sensors, buttons, temperature sensors, gas sensors, and/or other circuitry for detecting user input and for measuring environmental data. Sensors 80 may include inertial measurement units (e.g., accelerometers, compasses, and/or gyroscopes) for measuring the position, orientation, and/or movement of equipment 50. In some scenarios, a satellite navigation system receiver and/or an accelerometer or other inertial measurement unit circuitry can detect when equipment 50 is traveling within a range of speeds associated with motorized vehicles (e.g., when vehicle 20 is traveling between 20 and 80 miles per hour), when equipment 50 is experiencing changes in acceleration that are within a predetermined range of accelerations indicative of the travel of vehicle 20 along a road, when equipment 50 is traveling along a mapped roadway, and/or when equipment 50 is otherwise characterized by physical activity (positions, orientations, and/or movements) indicative of operating in a moving vehicle (e.g., when equipment 50 is characterized by parameters indicative of vehicular travel). Inertial measurement units may also monitor the movement of equipment 50 when a user is walking away from a vehicle after parking. For example, measurements from an inertial measurement unit in equipment 50 (e.g., a device carried by a user) may be used to detect when a car has been parked and a user has walked a certain distance, e.g., 10 m, away from the car such that interference mitigation may no longer be required.

As shown in FIG. 2, equipment 50 includes a battery such as battery 86 to provide equipment 50 with power and, if desired, to transmit wireless power. Communications circuitry 54 includes radio-frequency transmitter circuitry 58 (e.g., a transmitter that can be tuned to a desired transmission frequency, sometimes referred to as a tuned transmitter) and/or radio-frequency receiver circuitry 56 (e.g., a receiver that can be tuned to a desired reception frequency, sometimes referred to as a tuned receiver). Transmitter circuitry 58 uses an antenna (see, e.g., antennas 60) to transmit wireless signals. Receiver circuitry 56 uses an antenna (see, e.g., antennas 60) to receive wireless signals. In some configurations, receiver circuitry 56 receives wireless signals and/or transmitter circuitry 58 transmits wireless signals using a wireless power transmitting coil and/or a wireless power receiving coil (see, e.g., coils 68 and 72) that is otherwise used for handling wireless power signals. Configurations in which antenna(s) 60 is separate from coil(s) 68 and coil(s) 72 may also be used. Separate antennas and coils shared with wireless power transmission circuitry may be used with receiver and transmitter circuits and may therefore sometimes be referred to as forming part of the wireless transmitter circuitry and wireless receiver circuitry of equipment 50. Wireless communications can be transmitted and/or received at any suitable frequency (e.g., frequencies associated with vehicle remote keyless system operations when circuitry 54 is used as part of a system such as system 28 of FIG. 1 such as frequencies of 100-145 kHz associated with keyless system beacons, frequencies of 300-1000 MHz associated with key code transmissions from a key, and/or other frequencies), frequencies associated with wireless local area networks (e.g., 2.4 GHz, 5 GHz, other WiFi® frequencies, etc.), millimeter wave frequencies (e.g., frequencies above 10 GHz), cellular telephone frequencies (e.g., 700 MHz to 2.7 GHz, and/or frequencies below 700 MHz, and/or above 2.7 GHz), personal area network frequencies (e.g., 2.4 GHz for Bluetooth®), and/or other radio frequencies for supporting wireless communications between respective electronic devices.

Wireless power circuitry 62 may be included in electronic equipment 50. For example, vehicle 20, key 44, cellular telephones, wristwatches, battery cases, and/or other electronic devices may optionally include wireless power transmitting circuitry 64 and/or wireless power receiving circuitry 70. Wireless power transmitting circuitry 64 has an inverter 66 that provides an alternating-current drive signal (current) to coil(s) 68 to generate wireless power signals (alternating-current electromagnetic fields). The wireless power signals may be received using wireless power receiving circuitry in a receiving electronic device.

The receiving electronic device may have wireless power receiving circuitry such as wireless power receiving circuitry 70 of equipment 50. Circuitry 70 of illustrative electronic equipment 50 of FIG. 2 includes coil(s) 72 and rectifier 74. Using one or more coils 72, wireless power signals are received and corresponding current flow is induced in coil(s) 72. The current coil(s) 72 is rectified using rectifier 74 to charge battery 86 and/or to otherwise power circuitry in equipment 50.

Figure 3:
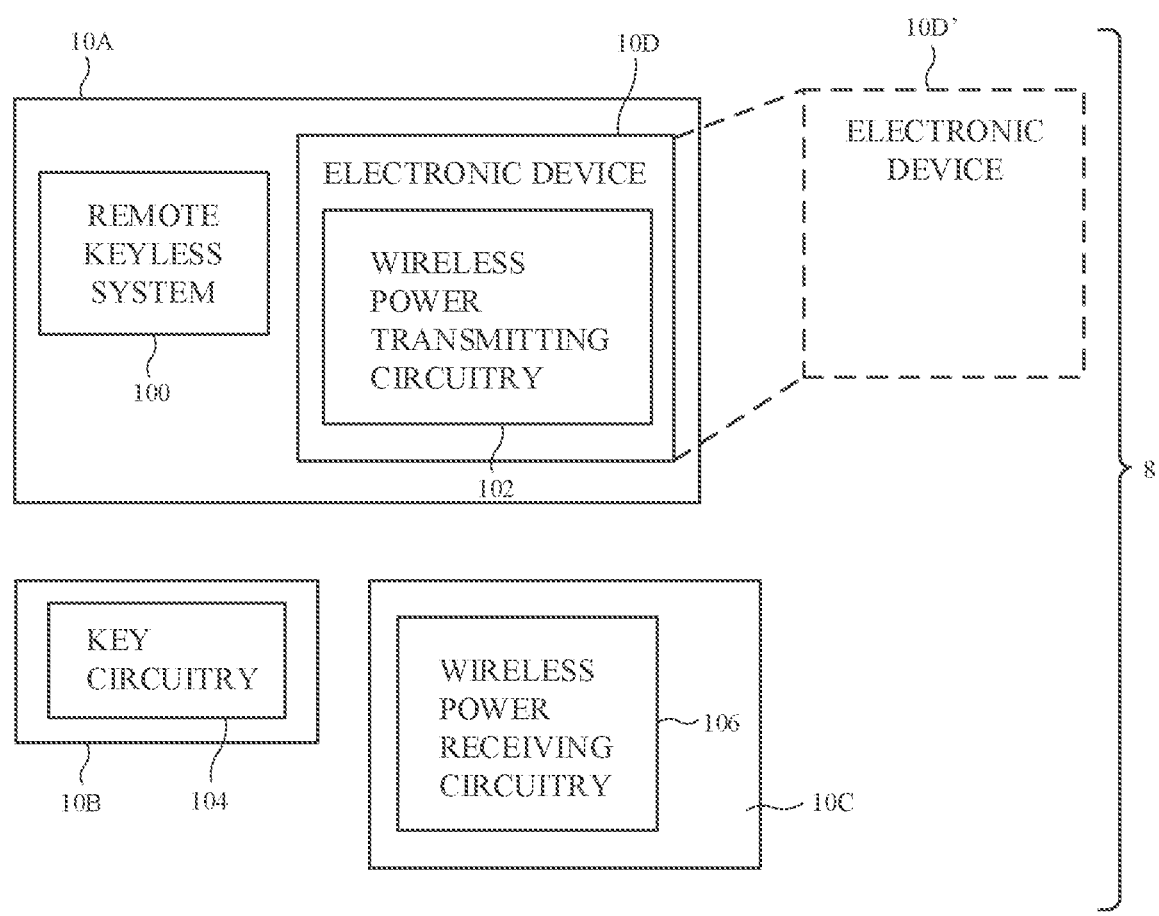
FIG. 3 is a diagram of an illustrative system with wireless power transfer capabilities and vehicle remote keyless system capabilities in accordance with an embodiment.

FIG. 3 is a diagram of an illustrative system 8 that contains a vehicle remote keyless system and wireless power circuitry. System 8 of FIG. 8 includes vehicle 10A, key 10B, electronic device 10C, and electronic device 10D. Other electronic systems may contain vehicle remote keyless systems and wireless power circuitry, if desired. System 8 of FIG. 3 is presented as an example.

Vehicle 10A of FIG. 3 may be a vehicle such as vehicle 20 of FIG. 1 and may include equipment of the type shown in FIG. 2. Vehicle 10A includes vehicle equipment such as vehicle remote keyless system 100 (see, e.g., system 28 of FIG. 1). As shown in FIG. 3 a battery case, wireless charging accessory (e.g., a charging pad or charging puck that receives wired power from vehicle 10A), or other electronic device 10D may be located in vehicle 10A. In some scenarios, electronic device 10D is located outside of vehicle 10A but near to vehicle 10A (e.g., within 10 m of vehicle 10A at a location such as location 10D'). Device 10D contains wireless power transmitting circuitry 102 and optionally contains additional electrical equipment (see, e.g., with optional wireless power receiving circuitry of wireless power circuitry 62 and other electronic equipment 50 of FIG. 2). During wireless power transfer operation, wireless power transmitting circuitry 102 may be used to transmit wireless power signals that are received by wireless power receiving circuitry 106 in electronic device 10C (e.g., to charge a battery in device 10C). Key 10B includes key circuitry 104 (see, e.g., key circuitry 40 of FIG. 1) and may include additional components (e.g., a display, cellular telephone transceiver circuitry, wireless local area network circuitry, sensors, etc.). Key 10B may be a key fob, a key card, a key built into a wristwatch, cellular telephone, tablet computer, or other portable electronic device, or other suitable wireless vehicle key.

Electronic device 10C includes wireless power receiving circuitry 106 (see, e.g., wireless power receiving circuitry 70 of wireless power circuitry 62 of FIG. 2) and may include other circuitry (e.g., some or all of the circuitry of electronic equipment 50 of FIG. 2). Electronic device 10C may be a portable electronic device such as a cellular telephone, tablet computer, wristwatch, or other electronic equipment.

In order to receive wireless power from wireless power transmitting circuitry 102, a user may place device 10C so that wireless power receiving circuitry 106 is sufficiently close to wireless power transmitting circuitry 102 to receive wireless power signals (e.g., within less than 10 cm, less than 2 cm, less than 1 cm, or other suitable distance, or in direct contact such that the wireless power receiving device is abutting the wireless power transmitting device). If, as an example, circuitry 102 is associated with a charging surface (e.g., a surface of a wireless power charging mat, a vehicle console surface or other built-in vehicle surface that overlaps wireless power coil(s), etc.), device 10C may be placed on the charging surface so that a wireless power receiving coil in circuitry 106 overlaps one or more corresponding wireless power transmitting coils in circuitry 102. As another example, if circuitry 102 forms part of a removable battery case with wireless power transmitting capabilities, a user may place device 10C in the removable battery case so that the wireless power receiving coil of circuitry 106 is electromagnetically coupled to one or more associated wireless power transmitting coils in circuitry 102.

When circuitry 106 and wireless power transmitting circuitry 102 are placed adjacent to each other or are otherwise located sufficiently close together to allow wireless power signals to be conveyed from circuitry 102 to circuitry 106, wireless power may be transferred. During wireless power transmission, the inverter in circuitry 102 drives alternating-current drive signals (e.g., signals at a frequency within a range of 110 kHz to 205 kHz or other suitable frequency) through one or more wireless power transmitting coils in circuitry 102 to transmit wireless power signals to circuitry 106. The alternating-current drive signals may be square wave signals, sinusoidal signals, signals with asymmetric waveforms, pulses with any suitable duty cycle, or other suitable alternating-current signals. Circuitry 106 uses corresponding coil(s) and rectifier circuitry to receive the wireless power signals and convert these signals into a power supply voltage for device 10C (e.g., to charge the battery in device 10C and/or to power other circuitry in device 10C).

Vehicle 10A uses remote keyless system 100 to wirelessly transmit vehicle remote keyless system beacons. These beacons may, as an example, have a frequency in a range of 100 to 145 kHz (as an example). Key 10B uses key circuitry 104 to monitor for the transmitted beacons and, if a beacon is received, key 10B uses key circuitry 104 to transmit corresponding key codes to remote keyless system 100 in response. Key 10B will not receive the beacons if key 10B is far away from vehicle 10A or if interference is present.

The presence of wireless power signals associated with the transfer of power from circuitry 102 to circuitry 106 has the potential to create interference that can prevent key circuitry 104 from satisfactorily receiving the wireless beacons from system 100. To mitigate situations in which key 104 is unable to receive beacons from system 100, the control circuitry of system 8 detects when interference is present, or likely to be present and takes suitable actions to mitigate the undesired effects of interference.

A user may carry both device 10C and key 10B (and, in some scenarios, key 10B can be implemented on device 10C). Because key 10B and device 10C are often in close proximity (e.g., because key 10B and device 10C are both in a user's pocket and/or because key 10B and device 10C are being carried in a bag of the user), interference risk can be detected by detecting conditions in which key 10B is near to vehicle 10A (in which case device 10C is also likely close to vehicle 10A and circuitry 102) and/or by detecting conditions in which device 10C is near to vehicle 10A (in which case key 10B is also likely close to vehicle 10A and circuitry 102). These interference scenarios can arise whether circuitry 102 is embedded into vehicle 10A or is otherwise associated with vehicle 10A or whether circuitry 102 is in a battery case or other device that is separate from vehicle 10A and is coupled to or otherwise associated with device 10C.

The control circuitry of system 8 that performs interference risk detection operations and interference mitigation operations includes control circuitry such as control circuitry 52 of FIG. 2. This control circuitry includes control circuitry located in an electronic device (e.g., a device such as device 10D that is separate from vehicle 10A and that is located in or near vehicle 10A) that contains wireless power transmitting circuitry 102, control circuitry that is located in key 10B, and/or control circuitry that is located in electronic device 10C. Control circuitry in different devices communicates wirelessly and/or using wired communications paths (when present).

Figure 4:
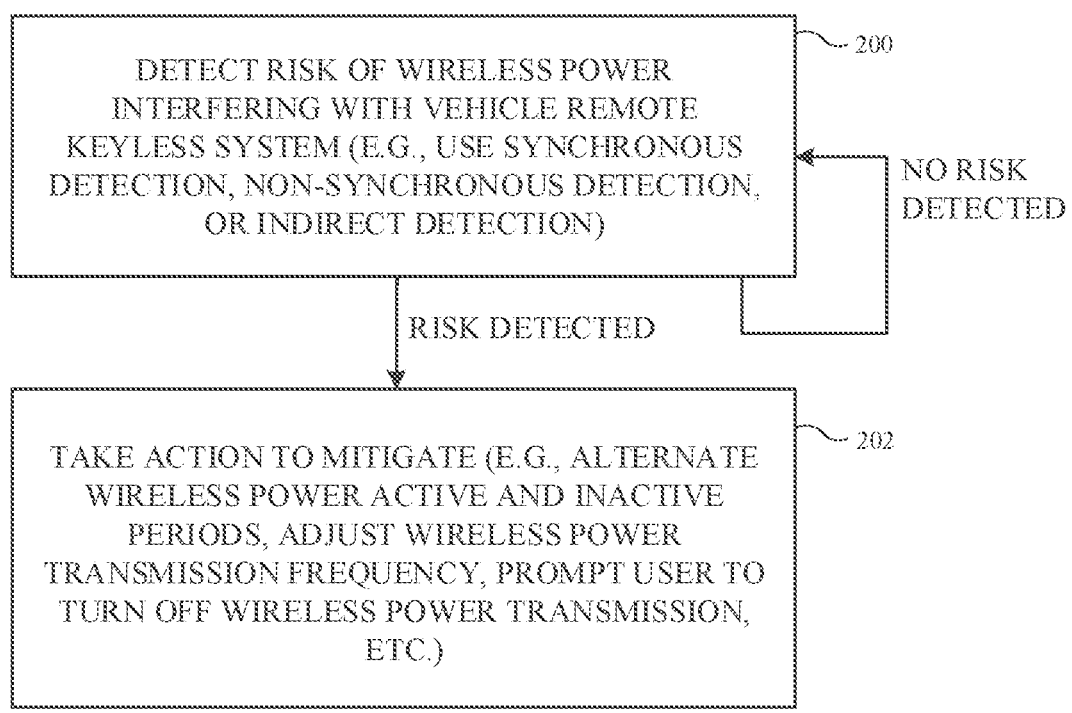
FIG. 4 is a flow chart of illustrative operations involved in operating a system of the type shown in FIG. 3 in accordance with an embodiment.

Illustrative interference detection operations and interference mitigation operations that may be performed in system 8 of FIG. 3 are shown in FIG. 4.

During the operations of block 200, the control circuitry of system 8 (e.g., an electronic device such as device 10C, device 10D, and/or other circuitry in FIG. 3) performs detection operations. During these detection operations, the control circuitry monitors the operation of system 8 to detect a condition that is associated with a possibility that wireless power signals from circuitry 102 will interfere with vehicle remote keyless system beacons being transmitted by system 100. If no interference possibility is detected (e.g., if the control circuitry determines that wireless power signals from circuitry 102 are not likely to create interference that hinders the reception of beacons by keys such as key 10B), no action need be taken (e.g., wireless power transmission may be permitted to continue uninterrupted). In response to detection of possibility of interference, however, the control circuitry of system 8 (e.g., an electronic device such as device 10C, device 10D, and/or other circuitry in FIG. 3) may, during the operation of block 202, take action to mitigate interference. In particular, during the operations of block 202, interference mitigation operations may be performed by the control circuitry. The mitigation operations help remove factors that create interference, thereby improving key circuitry 104's reception of beacons and transmissions to those beacons with wireless key codes.

In embodiments, one or more interference detection techniques are used by the control circuitry of device 10C, device 10D, and/or other control circuitry of system 8.

In a first illustrative arrangement for a first embodiment, which may sometimes be referred to as a synchronous detection scheme, the control circuitry of device 10C, device 10D, or other circuitry in system 8 uses radio-frequency receiver circuitry (see, e.g., circuitry 54) to monitor for the presence of the wireless beacons transmitted by remote keyless system 100. A coil that serves as an antenna for beacon signals and that is also sometimes used to receive and/or transmit wireless power signals or a separate wireless receiving structure (e.g., separate antenna(s), separate coil(s), one, two, or three orthogonal coils such as coils that serve as antennas separate from the wireless power receiving coil) and associated radio-frequency receiver circuitry are included in device 10C, device 10D, or other equipment in system 8. The receiving structure and radio-frequency receiver circuitry are configured to receive beacons at the wireless beacon frequency (e.g., a frequency of 100-145 kHz) and are thus used to automatically monitor for beacon transmissions. If desired, the radio-frequency receiver that is used to monitor for the beacon signals can receive and analyze digital data in the beacon signals to help confirm that the beacon signals are associated with a remote keyless system.

Wirelessly transmitted beacons have a limited range (e.g., less than 20 meters). If beacons are detected during the operations of block 200, it can be concluded that the detection circuitry (e.g., the antenna and associated radio-frequency receiver circuitry of device 10C, device 10D, or other circuitry in system 8) that has detected the beacons is near to system 100 (e.g., within 20 meters, as an example). For example, in response to detecting beacons from system 100 using an antenna and radio-frequency receiver circuitry in device 10C or device 10D that is sensitive to wireless signals in the range of 100-145 kHz), device 10C or device 10D can conclude that device 10C and/or device 10D is within the wireless beacon range of vehicle 10A and system 100. The radio-frequency receiver can be a homodyne circuit, a heterodyne circuit, or other tuned demodulator. Circuitry 102 and device 10D are in or near vehicle 10A, so by detecting that device 10C or device 10D is within wireless range of the beacons of system 10, device 10C or device 10D can conclude that device 10C and/or device 10D is sufficiently close to system 100 and circuitry 102 of vehicle 10A that there is a risk that any transmission of wireless power from circuitry 102 to circuitry 106 will create wireless power signals that will interfere with the wireless beacon signals being transmitted by system 100 and thereby impact reception of the wireless beacon signals by key 10B.

In a second illustrative arrangement for the first embodiment, device 10C or device 10D uses wireless receiver circuitry (see, e.g., radio-frequency receiver circuitry 56 of communications circuitry 54 in FIG. 2) to monitor for the presence of wireless key codes. When key 10B receives wireless beacons from system 100, key circuitry 104 responds by transmitting key codes (e.g., key codes at a frequency of 315 MHz to 435 MHz, 300-1000 MHz, or other suitable key code frequency). The wireless receiver circuitry of device 10C or device 10D has an antenna and radio-frequency receiver configured to detect transmission of the key codes by key 10B. When key codes are detected, device 10C, or device 10D can conclude that key 10B is within range of system 100 (because key 10B is likely transmitting the key codes in response to receiving beacons) and can conclude that device 10C or device 10D is near to key 10B and system 100 (because device 10C or device 10D is receiving the transmitted codes). By detecting that key 10B has likely been triggered by a nearby vehicle, device 10C or device 10D can determine that there is a risk that wireless power transmission operations (e.g., receipt of wireless power by wireless power receiving circuitry 106 from wireless power transmitting circuitry 102) will cause undesired interference, for example, by impacting reception of the beacon signals by key 10B).

In a second embodiment, which may sometimes be referred to as a non-synchronous detection technique, envelope detection technique, or peak detection technique, the control circuitry of device 10C, device 10D, or other circuitry in system 8 (e.g., circuitry 54 of FIG. 2) includes radio-frequency signal peak detector circuitry to monitor for the presence of the wireless beacons transmitted by remote keyless system 100. The communications circuitry of device 10C or device 10D may, for example, include receiver circuitry 56 that has analog and/or digital circuitry that is configured to implement a peak detector. The peak detector is configured to measure a peak in the transmitted or received wireless power signal that is above a baseline level without the presence of beacon signals. For example, in an arrangement in which the peak detector is coupled to a wireless power receiving coil that is otherwise being used to receive wireless power signals, the peak detector can detect signal peaks corresponding to beacons from system 100 that appear above the wireless power signal in the coil. One, two, or three separate orthogonal coils may also be used in receiving signals. If the measured signal magnitude (e.g., the measured maximum of the peak-to-peak voltage of a sample of the received signals at the beacon frequency) exceeds a predetermined threshold (e.g., a predetermined amount above the wireless power signal level or other baseline amount), the control circuitry can conclude that the beacon signals are present.

With the second embodiment, the radio-frequency receiver circuitry of device 10C or device 10D uses a receiving structure (e.g., a shared antenna(s), a separate antenna(s), a shared wireless power receiving coil(s), a coil that is shared between wireless power transmission and wireless signal receiving operations, or a separate coil(s)) and associated radio-frequency signal peak detector to monitor for signals at the beacon frequency that are characterized by a magnitude that exceeds a predetermined threshold value (e.g., a predetermined peak voltage). If desired, a bandpass filter may be coupled in series between the antenna and the peak detector. The bandpass filter can be configured to block all signals except signals within the possible range of beacon signal frequencies. For example, the bandpass filter may pass signals in a range of 100-145 kHz, may have a first pass band at 125 kHz (to correspond with a 125 kHz beacon) and a second pass band at 134 kHz (to correspond with a 134 kHz beacon) and/or may otherwise be configured to filter out signals other than those at beacon frequencies. If a beacon is transmitted, the peak detector will detect a wireless signal that exceeds the predetermined threshold and, in response to detecting that the peak signal strength at the beacon frequency has exceeded the predetermined threshold (predetermined peak voltage), it can be concluded that beacon signals are being transmitted.

In the second embodiment, it can be concluded that the peak detection circuitry (e.g., the antenna and associated peak detector of device 10C, device 10D, or other circuitry in system 8) is near to system 100 if beacons are detected. For example, in response to detecting beacons from system 100 using an antenna and radio-frequency peak detector in device 10C or device 10D that is sensitive to wireless signals in the range of 100-145 kHz, device 10C or device 10D can conclude that device 10C or device 10D is within wireless beacon range of vehicle 10A and system 100. Because circuitry 102 is in or near vehicle 10A, device 10C and/or device 10D can conclude, based on the detection of the beacons, that device 10C and/or device 10D is sufficiently close to system 100 and circuitry 102 of vehicle 10A that there is a risk that transmission of wireless power from circuitry 102 to circuitry 106 will interfere with the wireless beacon signals (and thereby prevent satisfactory reception of the wireless beacon signals by key 10B).

In a third embodiment, which may sometimes be referred to as an indirect detection technique, information on whether or not there is an interference risk is gathered by monitoring for conditions indicating that device 10C is nearby vehicle 10A. When device 10C is in the vicinity of vehicle 10A, circuitry 102 is likely within range of circuitry 106. As a result, wireless power transmissions may produce radio-frequency wireless power signals that interfere with the reception of beacons from system 100 by key 10B.

In a first illustrative arrangement for the third embodiment, the location of vehicle 10A can be monitored (e.g., using satellite navigation system circuitry such as global positioning system receiver 82 of FIG. 2 in device 10C). Whenever a user parks vehicle 10A, the vehicle's speed will drop from a speed associated with vehicular travel to zero, indicating that the vehicle is parked. By monitoring the speed of receiver 82, control circuitry (e.g., control circuitry in system 8 such as control circuitry in device 10C and/or other portions of system 8 can determine when vehicle 10A has parked and, from the location gathered by receiver 82, can determine where vehicle 10A has been parked. The control circuitry of system 8 (e.g., control circuitry in device 10C) can maintain vehicle parking location information indicating where vehicle 10A has been parked. During subsequent operations of device 10C, satellite navigation system circuitry such as global positioning system receiver 82 of FIG. 2 can be used to monitor the location of device 10C (e.g., after a user has exited vehicle 10A and is traveling by foot). The control circuitry of device 10C and/or other control circuitry of system 8 can periodically compare the known location of the user's parked vehicle (vehicle 10A) and the user's known location (the known location of device 10C). If device 10C is determined to be far from vehicle 10A, it can be concluded that there is no risk that wireless power reception by device 10C will interfere with beacons being sent by vehicle 10A to key 10B. In response to determining that device 10C has returned to the vicinity of vehicle 10A, however, it can be concluded that there is a risk that wireless power reception by device 10C will interfere with the beacons being sent by vehicle 10A to key 10B.

In a second illustrative arrangement for the third embodiment, control circuitry in system 8 such as control circuitry in device 10C can monitor the communications links that device 10C has established with vehicle 10A (e.g., by monitoring communications circuitry in device 10C such as communications circuitry 54 of FIG. 2 to determine whether device 10C has paired with vehicle 10A). It can be concluded that device 10C is in the vicinity of vehicle 10A (e.g., that device 10C is within 20 m or other given short distance of vehicle 10A and that there is therefore an interference risk) if any short-range wireless communications links have been established between device 10C and vehicle 10A (e.g., a short-range personal area network link such as a Bluetooth® link, a wireless local area network link such as an IEEE 802.11 link, or other wireless communications links for supporting wireless operations in which the capabilities of device 10C are shared with vehicle 10A such as Apple CarPlay® operations, a near-field communications link at a frequency of 13.56 MHz or other suitable near-field communications frequency, or other short-range wireless link that wirelessly pairs device 10C with vehicle 10A) and/or if device 10C is paired with vehicle 10A by virtue of establishing a wired communications link (e.g., for supporting a wired operations in which the capabilities of device 10C are shared with vehicle 10A such as wired Apple CarPlay® functions).

In a third illustrative arrangement for the third embodiment, control circuitry in system 8 such as control circuitry in device 10C uses input-output devices (e.g., input-output devices such as sensors 80 and/or satellite navigation system circuitry such as global positioning system receiver 82) to determine when device 10C is located in or near a vehicle. In this scenario, the control circuitry may, as an example, determine when device 10C is characterized by acceleration values, speed values, and other parameters that fall within a range of these parameters associated with vehicular travel (e.g., parameters associated with automotive capabilities). Consider, as an example speed. A user typically walks or runs at speeds of less than 10 miles per hour. So when a user is experiencing speeds above 10 miles per hour, the user is likely in a moving vehicle. Similarly, acceleration values with predetermined characteristics are associated with vehicular travel (e.g., acceleration values above a predetermined minimum acceleration value, below a predetermined maximum acceleration value, and characterized by a variation in acceleration value over time within a predetermined range (due to vehicular motion along a roadway). If desired, the control circuitry can determined whether a user is located on a roadway and/or is traveling along a roadway (e.g., using map data and satellite navigation system position and/or velocity information). Using input-output devices in device 10 (e.g., an accelerometer, other inertial measurement unit circuitry, satellite, navigation system circuitry, and/or other circuitry), the motion, orientation, and/or position of device 10C can therefore be analyzed to determine whether device 10C is experiencing characteristics indicative of vehicular travel and is therefore likely in vehicle 10A. Techniques such as these may also be used to determine when a user has parked a car and is still within 20 m or other short distance from the car (e.g., by measuring how many steps the user has taken after parking).

Any one or more of these illustrative interference risk detection techniques and/or other suitable interference risk detection techniques may be used to detect interference risk and may be used in conjunction with any one or more suitable interference mitigation techniques.

Illustrative interference mitigation approaches that may be used in system 8 involve changes to the transmission of wireless power signals between circuitry 102 and circuitry 106 to help prevent the wireless power signals from blocking the reception by key 10B of the beacons being transmitted by system 100.

With a first illustrative embodiment, control circuitry in device 10C, control circuitry in vehicle 10A, and/or other control circuitry in system 8 may automatically cease wireless power transmission operations to prevent wireless power signals from interfering with beacons from system 100. For example, wireless power transmitting circuitry 102 may be turned off in response to detecting an interference risk so that no wireless power signals are transmitted by circuitry 102 (e.g., until the risk is no longer detected).

Vehicle 10A and/or device 10C can turn off circuitry 102 in this way. For example, device 10C can transmit power adjustment commands to circuitry 102 that direct circuitry 102 to lower the magnitude of transmitted power to zero. Circuitry 102 may be turned off completely in this way or, if desired, circuitry 102 may be instructed to reduce the amount of transmitted power to a small non-interfering level (e.g., an amount less than 10% or less than 3% of the maximum wireless power transmission capability of system 8 its maximum capacity, as an example). If desired, a user may be provided with an opportunity to manually turn off (or reduce) power transmission. For example, a user may be provided with an on-screen option on a touch-screen display on device 10C or may otherwise may be prompted for input to confirm that wireless power transmission should be halted (or at least the amount of power transmitted should be reduced to a level that avoids interference or other adjustments made to avoid interference). An on-screen option may include a message such as "wireless key operation may be impacted by wireless power activities—press here to pause wireless power operations". Voice prompts, button options, and other input-output arrangements may be used to gather user input indicating that wireless power transmission should be turned off or otherwise curtailed. Scenarios in which wireless power transmissions are turned off to prevent interference allow key 10B to be used to operate vehicle 10A, but interrupt wireless power transfer because no wireless power signals are being transmitted.

In a second illustrative embodiment, circuitry 102 is directed by the control circuitry of system 8 to transmit wireless power signals intermittently. As an example, circuitry 102 may be configured to alternate between first and second operating modes in accordance with a given duty cycle (e.g., a duty cycle of 50%, at least 30%, less than 70%, etc.) when it is desired to perform interference mitigation. In the first operating mode, wireless power is transmitted (e.g., wireless power transmitting circuitry 102 is active and wireless power receiving circuitry 106 is able to receive transmitted wireless power signals). During operations in the first operating mode, interference is likely present. In the second operating mode, however, wireless power transmitting circuitry 102 lowers or completely halts wireless power transmission to prevent interference. By selection of an appropriate duty cycle, beacons can be received by key 10B during the second periods. For example, an appropriate duty cycle provides that the second periods are sufficiently long relative to the alternating first periods, such that sufficient interference-free time is available for the remote keyless system to operate without being impeded by the transmission of wireless power. The first periods and second periods may be, for example, 2.5 s long (or other suitable length such as a time period of at least 2 s, at least 3 s, less than 5 s, etc.). This length of time (e.g., 2.5 s) for the second period is sufficient for the vehicle remote keyless system to complete handshaking operations (which typically take about 30-200 ms) and to accommodate the polling interval used by vehicles in sending beacons (which may be, for example, 500 ms for some vehicles, 2000 ms for other vehicles, etc.). In an illustrative configuration, the duty cycle can be variable, that is, the off time can be varied between 250 ms to 2500 ms. Arrangements in which the duty cycle is fixed (e.g., the off time has a fixed value of between 250 and 2500 ms) may also be used. An appropriate duty cycle provides that the second periods are not so long such that wireless power operations must be completely restarted (e.g., circulating currents are not drained), so that a meaningful amount of wireless power is transmitted between circuitry 102 and circuitry 106 to support operations of the receiving device over the course of the duty cycles as the wireless power transmitter and receiver continue to operate in-vehicle. This second illustrative embodiment therefore permits remote keyless system operations and wireless power transfer operations to coexist.

In a third illustrative embodiment, interference mitigation operations involve adjusting parameters associated with the alternating-current drive signal used by inverter 66 to drive signals to coil(s) 68 (FIG. 2). The alternating-current drive signal may be, for example, an alternating-current waveform having frequency f. A first example of a parameter that may be adjusted to reduce interference is the shape of the waveform used for the alternating-current drive signal and the resulting wireless power signal (e.g., whether the waveform is a square wave, a sinusoidal signal, a symmetric or asymmetric waveform with another shape, a pulse train with pulses of a particular duty cycle, and/or other changes to the shape of the current signal flowing through coil(s) 68 and the resulting wireless power signal transmitted by circuitry 102). A second example of a parameter that may be adjusted to reduce interference is the frequency f of the alternating-current drive signal and corresponding wireless power signal. Frequency f lies within a frequency range of 110 kHz to 205 kHz (as an example). To prevent interference, frequency f can be shifted to a particular extreme of this range (e.g., 110 kHz or 205 kHz), may alternate between first and second frequencies in this range, may be swept repeatedly between first and second frequencies, may hop between two or more different frequencies in a predetermined pattern or random pattern, and/or may otherwise be adjusted (e.g., to a frequency that is at least different than the beacon frequency and that does not interfere with the beacon frequency). The wireless power transfer efficiency of system 8 may decrease as a result of modifying the coil drive signal and corresponding transmitted wireless power signal, but due to the changes in waveform and/or frequency of the wireless power signal, interference issues may be reduced sufficiently to allow wireless power transmissions to coexist with remote keyless system beacons.

Any one or more of the forgoing illustrative interference risk detection techniques may be used to detect interference risk and may be used in conjunction with any one or more of the illustrative interference mitigation techniques.

In a first implementation, interference is detected using synchronous detection and is mitigated by automatically ceasing wireless power transmission operations.

In a second implementation, interference is detected using synchronous detection and is mitigated by transmitting wireless power signals intermittently.

In a third implementation, interference is detected using synchronous detection and is mitigated by adjusting the waveform of the alternating-current drive signal used by the inverter.

In a fourth implementation, interference is detected using synchronous detection and is mitigated by adjusting the frequency of the alternating-current drive signal used by the inverter.

In a fifth implementation, interference is detected using non-synchronous detection and is mitigated by automatically ceasing wireless power transmission operations.

In a sixth implementation, interference is detected using non-synchronous detection and is mitigated by transmitting wireless power signals intermittently.

In a seventh implementation, interference is detected using non-synchronous detection and is mitigated by adjusting the waveform of the alternating-current drive signal used by the inverter.

In an eight implementation, interference is detected using non-synchronous detection and is mitigated by adjusting the frequency of the alternating-current drive signal used by the inverter.

In a ninth implementation, interference is detected using an indirect detection technique in which a wireless receiver detects key codes and is mitigated by automatically ceasing wireless power transmission operations.

In a tenth implementation, interference is detected using an indirect detection technique in which a wireless receiver detects key codes and is mitigated by transmitting wireless power signals intermittently.

In an eleventh implementation, interference is detected using an indirect detection technique in which a wireless receiver detects key codes and is mitigated by adjusting the waveform of the alternating-current drive signal used by the inverter.

In a twelfth implementation, interference is detected using an indirect detection technique in which a wireless receiver detects key codes and is mitigated by adjusting the frequency of the alternating-current drive signal used by the inverter.

In a thirteenth implementation, interference is detected using an indirect detection technique based on location monitoring and is mitigated by automatically ceasing wireless power transmission operations.

In a fourteenth implementation, interference is detected using an indirect detection technique based on location monitoring and is mitigated by transmitting wireless power signals intermittently.

In a fifteenth implementation, interference is detected using an indirect detection technique based on location monitoring and is mitigated by adjusting the waveform of the alternating-current drive signal used by the inverter.

In a sixteenth implementation, interference is detected using an indirect detection technique based on location monitoring and is mitigated by adjusting the frequency of the alternating-current drive signal used by the inverter.

In a seventeenth implementation, interference is detected using an indirect detection technique in which control circuitry monitors communications links established by a device with a vehicle and is mitigated by automatically ceasing wireless power transmission operations.

In a eighteenth implementation, interference is detected using an indirect detection technique in which control circuitry monitors communications links established by a device with a vehicle and is mitigated by transmitting wireless power signals intermittently.

In a nineteenth implementation, interference is detected using an indirect detection technique in which control circuitry monitors communications links established by a device with a vehicle and is mitigated by adjusting the waveform of the alternating-current drive signal used by the inverter.

In a twentieth implementation, interference is detected using an indirect detection technique in which control circuitry monitors communications links established by a device with a vehicle and is mitigated by adjusting the frequency of the alternating-current drive signal used by the inverter.

In a twenty-first implementation, interference is detected using an indirect detection technique in which input-output circuitry is used to determine when a device is located in a vehicle and is mitigated by automatically ceasing wireless power transmission operations.

In a twenty-second implementation, interference is detected using an indirect detection technique in which input-output circuitry is used to determine when a device is located in a vehicle and is mitigated by transmitting wireless power signals intermittently.

In a twenty-third implementation, interference is detected using an indirect detection technique in which input-output circuitry is used to determine when a device is located in a vehicle and is mitigated by adjusting the waveform of the alternating-current drive signal used by the inverter.

In a twenty-fourth implementation, interference is detected using an indirect detection technique in which input-output circuitry is used to determine when a device is located in a vehicle and is mitigated by adjusting the frequency of the alternating-current drive signal used by the inverter.

In a twenty-fifth implementation, interference is detected using synchronous detection and is mitigated by prompting a user for input and adjusting ceasing wireless power transmission operations in response to the user input.

In a twenty-sixth implementation, interference is detected using non-synchronous detection and is mitigated by prompting a user for input and adjusting ceasing wireless power transmission operations in response to the user input.

In a twenty-seventh implementation, interference is detected using indirect detection and is mitigated by prompting a user for input and adjusting ceasing wireless power transmission operations in response to the user input.

The foregoing describes a technology that uses data communication in the context of power transfer operations. The present disclosure contemplates that it may be desirable for power transmitter and receiver circuitry to communicate information such as states of charge, charging speeds, power transfer levels, and other wireless power transmission settings to control power transfer. The above-described technology need not involve the use of personally identifiable information in order to function. To the extent that implementations of this charging technology involve the use of personally identifiable information, implementers should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing is merely illustrative and various modifications can be made to the described embodiments. The foregoing embodiments may be implemented individually or in any combination.

What is claimed is:

1. An electronic device configured to receive wireless power from wireless power transmitting circuitry in or near a vehicle that has a vehicle remote keyless system configured to transmit vehicle remote keyless system beacons to a key and to receive wireless key signals from the key, the electronic device comprising:
    wireless power receiving circuitry configured to receive wireless power signals from the wireless power transmitting circuitry;
    detector circuitry configured to measure a first wireless signal magnitude at a beacon frequency associated with the vehicle remote keyless system beacons and a second wireless signal magnitude at the beacon frequency associated with the wireless power signals in an absence of communication between the vehicle remote keyless system and the key; and control circuitry configured to:
  detect a condition indicating that transmission of the wireless power signals will create interference with the vehicle remote keyless system beacons transmitted by the vehicle remote keyless system based on the first and second wireless signal magnitudes; and
  mitigate the interference in response to detecting the condition.

2. The electronic device of claim 1 wherein the wireless power receiving circuitry includes a wireless power receiving coil and wherein the control circuitry is configured to detect the condition using the wireless power receiving coil.

3. The electronic device of claim 2 wherein the detector circuitry is configured to use the wireless power receiving coil to measure the first wireless signal magnitude.

4. The electronic device of claim 2 further comprising:
a receiver tuned to a frequency, wherein the control circuitry is configured to detect the condition by using the receiver tuned to the frequency to receive signals with the wireless power receiving coil.

5. The electronic device of claim 4 wherein the receiver is configured to receive the vehicle remote keyless system beacons transmitted by the vehicle remote keyless system, wherein the control circuitry is configured to detect the condition based on the received vehicle remote keyless system beacons, and wherein the receiver is tuned to a frequency of 100 to 145 kHz.

6. The electronic device of claim 4 wherein the receiver is configured to receive the wireless key signals transmitted by the key, wherein the control circuitry is configured to detect the condition based on the received wireless key signals, and wherein the receiver is tuned to a frequency of 300 MHz to 1000 MHz.

7. The electronic device of claim 1 wherein the wireless power receiving circuitry includes a wireless power receiving coil, the electronic device further comprising an antenna separate from the wireless power receiving coil, wherein the control circuitry is configured to detect the condition using the antenna.

8. The electronic device of claim 7 wherein the detector circuitry is configured to use the antenna to measure the first wireless signal magnitude.

9. The electronic device of claim 7 further comprising:
a receiver tuned to a frequency, wherein the control circuitry is configured to detect the condition by using the receiver tuned to the frequency to receive signals with the antenna, wherein the receiver is configured to receive the vehicle remote keyless system beacons transmitted by the vehicle remote keyless system, wherein the control circuitry is configured to detect the condition based on the received vehicle remote keyless system beacons, and wherein the receiver is tuned to a frequency of 100 to 145 kHz.

10. The electronic device of claim 9 wherein the receiver is configured to receive the wireless key signals transmitted by the key and wherein the control circuitry is configured to detect the condition based on the received wireless key signals.

11. The electronic device of claim 10 wherein the receiver is tuned to a frequency of 300 MHz to 1000 MHz.

12. The electronic device of claim 1 wherein the control circuitry is configured to mitigate the interference by transmitting commands to the wireless power transmitting circuitry in response to detection of the condition that cause the wireless power transmitting circuitry to alternately adjust the transmission of the wireless power signals between first and second modes in accordance with a duty cycle, wherein a given amount of power is transmitted by the wireless power transmitting circuitry in the first mode and less than the given amount of power is transmitted by the wireless power transmitting circuitry in the second mode.

13. The electronic device of claim 1 wherein the wireless power signals have a first frequency, wherein the vehicle remote keyless system beacons have a second frequency, and wherein the control circuitry is configured to mitigate the interference by transmitting commands to the wireless power transmitting circuitry in response to detection of the condition that cause the wireless power transmitting circuitry to adjust the first frequency to be different than the second frequency.

14. The electronic device of claim 1 wherein the control circuitry is configured to mitigate the interference by transmitting commands to the wireless power transmitting circuitry in response to detection of the condition that cause the wireless power transmitting circuitry to halt transmission of the wireless power signals between the wireless power transmitting circuitry and the wireless power receiving circuitry.

15. An electronic device configured to receive wireless power from wireless power transmitting circuitry in or near a vehicle that has a vehicle remote keyless system configured to transmit vehicle remote keyless system beacons to a key and to receive wireless key signals from the key, the electronic device comprising:
  a battery;
  wireless power receiving circuitry configured to receive wireless power signals from the wireless power transmitting circuitry to charge the battery; and
  control circuitry configured to:
    detect a condition indicating that transmission of the wireless power signals will create interference with the vehicle remote keyless system beacons transmitted by the vehicle remote keyless system; and
    mitigate the interference in response to detecting the condition by transmitting commands to the wireless power transmitting circuitry that cause the wireless power transmitting circuitry to alternatively adjust the transmission of the wireless power signals between first and second modes in accordance with a duty cycle, wherein the second mode of transmission coincides with the vehicle remote keyless system beacons.

16. The electronic device of claim 15 further comprising:
satellite navigation system circuitry configured to gather location information, wherein the control circuitry is configured to detect the condition using the location information.

17. The electronic device of claim 16 wherein the control circuitry is configured to:
  save a vehicle parking location gathered by the satellite navigation system circuitry in response to parking of the vehicle; and
  detect the condition by comparing a current location gathered by the satellite navigation system circuitry to the vehicle parking location.

18. The electronic device of claim 15 further comprising:
wireless transceiver circuitry configured to wirelessly pair with wireless circuitry in the vehicle, wherein the control circuitry is configured to detect the condition by determining when the wireless transceiver circuitry is wirelessly paired with the wireless circuitry in the vehicle.

19. The electronic device of claim 15 further comprising:
an inertial measurement unit, wherein the control circuitry is configured to detect the condition by using the inertial measurement unit to detect motion representative of vehicular travel.

20. The electronic device of claim 15 wherein the control circuitry is configured to mitigate the interference by adjusting transmission of the wireless power signals by prompting user input and adjusting transmission of the wireless power signals in response to the user input.

21. The electronic device of claim 15 wherein a given amount of power is transmitted by the wireless power transmitting circuitry in the first mode and less than the given amount of power is transmitted by the wireless power transmitting circuitry in the second mode.

22. The electronic device of claim 15 wherein the wireless power signals have a first frequency, wherein the vehicle remote keyless system beacons have a second frequency, and wherein the control circuitry is configured to mitigate the interference by transmitting commands to the wireless power transmitting circuitry in response to detection of the condition that cause the wireless power transmitting circuitry to adjust the first frequency to be different than the second frequency.

23. The electronic device of claim 15 wherein the control circuitry is configured to mitigate the interference by transmitting commands to the wireless power transmitting circuitry in response to detection of the condition that cause the wireless power transmitting circuitry to halt transmission of the wireless power signals between the wireless power transmitting circuitry and the wireless power receiving circuitry.

24. The electronic device of claim 15 wherein the control circuitry is configured to mitigate the interference by prompting user input in response to detection of the condition and by transmitting commands to the wireless power transmitting circuitry in response to the user input that cause the wireless power transmitting circuitry to halt transmission of the wireless power signals.

25. An electronic device configured to receive wireless power from wireless power transmitting circuitry in or near a vehicle that has a vehicle remote keyless system configured to transmit vehicle remote keyless system beacons to a key and to receive wireless key signals from the key, the electronic device comprising:
wireless power receiving circuitry configured to receive wireless power signals from the wireless power transmitting circuitry; and
control circuitry configured to:
detect a condition indicating that transmission of the wireless power signals will create interference with the vehicle remote keyless system beacons transmitted by the vehicle remote keyless system; and
mitigate the interference in response to detecting the condition by prompting user input and transmitting commands to the wireless power transmitting circuitry in response to the user input that cause the wireless power transmitting circuitry to halt transmission of the wireless power signals.

* * * * *